United States Patent [19]

Helm

[11] 4,059,295
[45] Nov. 22, 1977

[54] TUBE COUPLING

[75] Inventor: Homer E. Helm, Troy, Mich.

[73] Assignee: Gordon H. Cork, Birmingham, Mich.

[21] Appl. No.: 741,235

[22] Filed: Nov. 12, 1976

[51] Int. Cl.² .................................................. F16L 21/06
[52] U.S. Cl. .................................... 285/305; 285/105; 285/323; 285/423
[58] Field of Search ............... 285/105, 104, 323, 321, 285/305, 243, 423, 113

[56] References Cited

U.S. PATENT DOCUMENTS

| 3,222,091 | 12/1965 | Marshall | 285/243 |
| 3,414,299 | 12/1968 | Roe | 285/321 |
| 3,527,485 | 9/1970 | Goward et al. | 285/305 |
| 3,653,689 | 4/1972 | Sapy et al. | 285/113 |
| 4,005,884 | 2/1977 | Drori | 285/105 X |

FOREIGN PATENT DOCUMENTS

| 1,012,498 | 7/1957 | Germany | 285/305 |
| 649,694 | 12/1962 | Italy | 285/321 |
| 730,339 | 5/1955 | United Kingdom | 285/321 |

Primary Examiner—Thomas F. Callaghan
Attorney, Agent, or Firm—Barnes, Kisselle, Raisch & Choate

[57] ABSTRACT

A releasable tube coupling wherein the tube is releasably retained in the coupling body by means of a sleeve in said body surrounding said tube and held in clamping engagement therewith by means of a U-shaped clip. The clip extends transversely through the body and engages a pair of cams or ramps on the sleeve which retain the sleeve and are effective to more firmly clamp the tube when a force is exerted on the tube in the direction outwardly from the fitting.

10 Claims, 4 Drawing Figures

TUBE COUPLING

This invention relates to a releasable fluid-tight coupling for metal and for at least semi-rigid plastic tubes.

In many industrial applications and consumer products metal or semi-rigid plastic tubing is employed for conducting fluids under pressure to and from fluid-operated devices. The tubing is connected to the supply source of the fluid and to the operated device by means of couplings. From the standpoint of operation it is important that the couplings are fluid-tight; from the standpoint of servicing it is important that the tubing is adapted to be easily and readily connected to and disconnected from the coupling.

It is an object of this invention to provide a coupling of the type described which meets the aforementioned practical requirements and which, at the same time, is designed so that it can be manufactured economically.

Another object of the invention resides in the provision of a tube coupling, the body of which is designed so that it can be molded from plastic in an economical manner.

More specifically, the coupling of this invention employs a tube clamping collet in the form of a circumferential contractible sleeve through which the tubing extends. The sleeve is arranged within a central bore in the coupling body. On diametrically opposite sides thereof the sleeve has a pair of circumferentially extending recesses therein. One side of each recess forms an axially extending cam surface. The body of the coupling has a pair of diametrically opposite apertures extending transversely therethrough and registering with the recesses in the outer surface of the sleeve. A U-shaped clip is inserted through the apertures in the body and engages the recesses on the sleeve to circumferentially contract it and to thereby at least frictionally engage the outer cylindrical surface of the tube. When the tube is subjected to an axial outward force relative to the coupling body or the sleeve, the legs of the clip engage the cam surfaces of the recesses on the sleeve and apply a radially inwardly directed pressure thereto to more firmly clamp the sleeve around the tube.

Other objects, features and advantages of the present invention will become apparent from the following description and accompanying drawing, in which.

Figure 1:
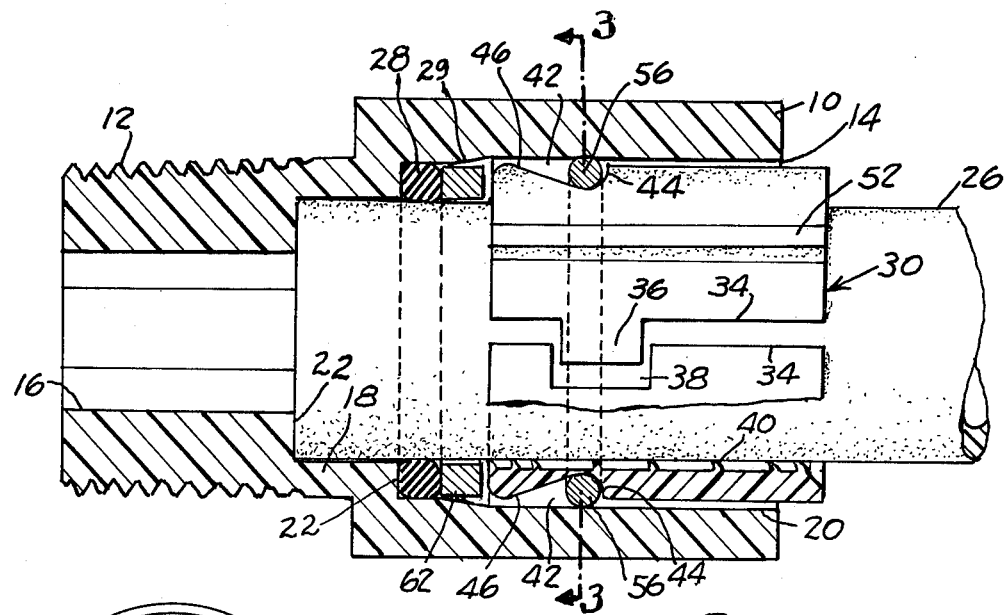
FIG. 1 is a longitudinal sectional view through the coupling of this invention.

Referring to the drawing, the coupling has a body 10, one end of which is threaded as at 12 for connection with a fluid pressure device. Body 10 has a central through bore 14 which includes three radially stepped sections 16,18,20. Bore section 16 is connected with bore section 18 by means of a radially outwardly extending shoulder 22 and bore section 20 is connected with bore section 18 by means of radially inwardly extending shoulder 24. Each of the bore sections is concentric with the longitudinal axis of body 10. Bore section 18 has a diameter slightly larger than the outer diameter of tube 26 so that the tube can be inserted into the body 10 with its end abutting against shoulder 22. An O-ring 28 is located in the bore portion 20 and encircles the end portion of tube 26 to form a fluid-tight connection therebetween. Bore portion 20 is ensmalled slightly adjacent shoulder 22 to provide a cylindrical land 27 which forms a seat for O-ring 28 and which is connected with bore section 20 by a conical surface 29 which prevents damage to the O-ring. O-ring 28 may be replaced by any other type of suitable seal.

The means for releasably locking tube 26 in coupling body 10 includes a resilient sleeve 30 which is preferably formed as two similar semi-circular half sections. The two sleeve sections 30 have circumferentially spaced parted edges 34 which extend through the length of the sleeve. The parted edges 34 on each sleeve section are preferably formed one with a lug 36 and the other with a notch 38 into which lug 36 projects. Sleeve 30 can also be formed as a longitudinally split one-piece plastic member. The inner cylindrical surface of sleeve 30 is formed with a plurality of small circular ribs 40 which form a serrated surface for tightly gripping the outer cylindrical surface of tube 26. Ribs 40 are preferably slightly inclined in a direction toward the inner end of sleeve 30. When the sleeve is formed of plastic, ribs 40 are relatively rigid so as to firmly grip tube 26. On diametrically opposite sides thereof the outer peripheral surface of sleeve 30 is formed with a pair of recesses 42. Each recess 42 is defined by a radially outwardly extending shoulder 44 at one side thereof and by a radially outwardly inclined cam surface 46 at the axially opposite side thereof. Cam surfaces 46 incline radially outwardly in a direction toward the threaded end 12 of body 10.

Figure 3:
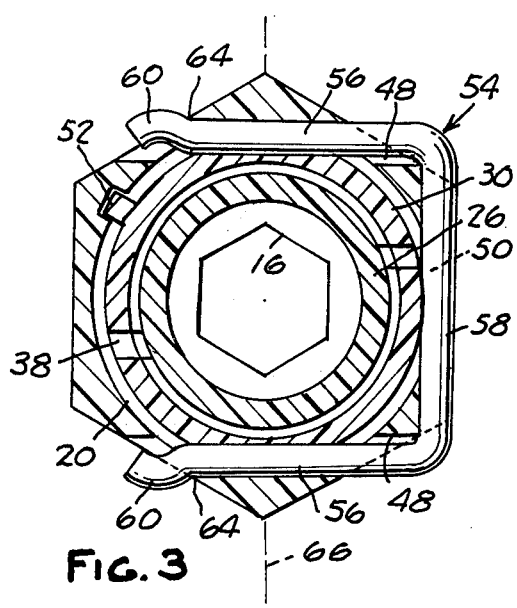
FIG. 3 is a sectional view along the line 3—3 in FIG. 1.

Referring now to FIG. 3, body 10 is formed on diametrically opposite sides thereof with a pair of apertures 48 intersecting bore section 20. Apertures 48 are interconnected by a transverse groove 50 in the outer surface at one side of body 10. In the arrangement illustrated body 10 is of hexagonal shape. However, it can be formed of circular or other configuration if desired. Likewise, bore section 16 can be of either circular, hexagonal or other wrench-engaging shape in cross section. An additional groove (not shown) similar to groove 50 can be formed on the diametrically opposite side of body 10 so as to extend between the other ends of the two apertures 48. Body 10 and one sleeve section 30 may also be provided with an axially extending key and slot formation such as shown at 52 for properly positioning sleeve 30 relative to the body so that when the sleeve is inserted into bore 20 the recesses 42 will be aligned with apertures 48.

A U-shaped clip 54 is utilized for locking sleeve 30 within bore 20 and for causing sleeve 30 to tightly clamp around the outer cylindrical surface of tube 26. Clip 54 is fashioned with a pair of parallel legs 56 which are interconnected at one end by a bight portion 58. The free ends of legs 56 are curved laterally outwardly as shown in FIG. 3 to form locking detents 60. Apertures 48 are only slightly larger in cross section than legs 56 of spring clip 54. Thus, when the spring clip is inserted into the apertures 48, the apertures restrain movement of the spring clip in a direction axially of the coupling body and also restrain movement of legs 56 in a radially outwardly direction.

In assembling the coupling for shipment, sleeve 30 is inserted into bore 20 utilizing the key and slot arrangement 52 for properly orienting the sleeve circumferentially relative to apertures 48. Since sleeve 30 has axially parted ends, a solid ring 62 is arranged between the inner end of the sleeve and O-ring 28. When sleeve 30 is fully inserted into bore section 20 recesses 42 in the outer surface of sleeve 30 will be aligned axially with apertures 48 in body 10. After the sleeve is so located in body 10, the legs 56 of spring clip 54 are forced through apertures 48 until the clip is in the fully seated position illustrated in FIG. 3. One or all of clip, sleeve and body is sufficiently yieldable or displaceable to permit insertion of the curved ends 60 of the clip to the fully seated position. In this position the bight portion 58 of the clip is seated in groove 50 and the locking detents 60 interengage with outer surface portions of the body as at 64 to securely lock clip 54 and sleeve 30 in place.

In use the end of tube 26 is telescoped through sleeve 30 and O-ring 28 into bore section 18. The inner diameter of sleeve 30 is dimensioned so that, when legs 56 of clip 54 are engaged with the bottoms of recesses 42 (FIG. 1), the sleeve is slightly smaller than and frictionally engages the outer surface of the tube. This enables insertion of tube 26 through the sleeve quite readily and insures frictional retention of the tube. However, when an axial outward force is applied to the tube (such as by pulling outwardly on the tube or by directing fluid under pressure through the coupling), sleeve 30 contracts around and tightly clamps the tube in the coupling. As the tube shifts axially in an outward direction, the interengagement of legs 56 with the inclined faces 46 cams the two half sections of the sleeve radially inwardly. The outer end of sleeve 30 projects outwardly beyond the end of the body. This facilitates the application of an axially inwardly directed force to the outer end of the sleeve either manually or by a suitable tool to relieve the clamping action of the sleeve and thus permit withdrawal of the tube when desired.

In the preferred embodiment it is most practical to form sleeve 30 and body 10 of plastic material. When formed of plastic these members are sufficiently yieldable or otherwise displaceable to enable the legs 56 with the detents 60 thereon to be inserted through the body 10 to the position shown in FIG. 3. In addition, it will be noted that apertures 48 extend through body 10 in a straight path. Thus, if body 10 is molded from plastic and the parting line of the mold is located centrally of the body in a plane perpendicular to the axes of passageways 48, the line designated 66 in FIG. 3, these apertures can be easily molded by blade-type projections on the separable two halves of the molding die cooperating with the core pin in the die which defines bore section 20.

Figure 2:
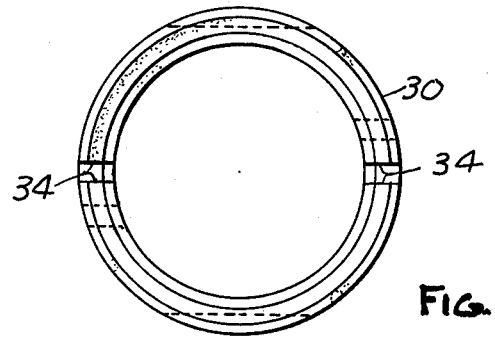
FIG. 2 is an end view of the sleeve shown in FIG. 1 which encircles the tube.
Figure 4:
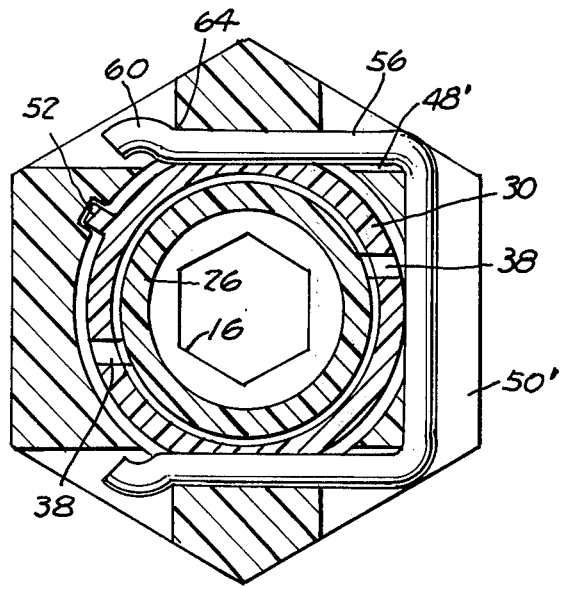
FIG. 4 is a view similar to FIG. 3 and showing a modified embodiment of the invention.

FIG. 4 illustrates a coupling substantially identical in shape and construction with that shown in FIGS. 1 through 3. However, in the arrangement illustrated in FIG. 4 body 10 is of larger proportions relative to tube 26 and sleeve 30. When the size ratio between tube 26 and body 10 is on the order illustrated in FIG. 4 it is apparent that the passageways 48' and 50' can be so formed that when the clip 54 is inserted in the body to its locking position, it lies completely within the confines of the body and does not project exteriorly thereof. In some applications it may be desirable to so form the coupling body that the clip does not protrude outwardly therefrom. In other respects the arrangement shown in FIG. 4 is substantially the same as shown in FIG. 3 and only slight modification of the projections in the molding die would be necessary.

It will be appreciated that the invention is not only applicable to the straight coupling illustrated but to numerous other types of couplings, such as tees, elbows, crosses, etc., and even multiple outlet fittings.

I claim:

1. A releasable tube coupling comprising a body having a bore extending axially therethrough, said bore having an open end for receiving said tube, a resilient, annular tube clamping sleeve in said bore, said sleeve having a central bore through which the tube is adapted to be inserted, said sleeve being circumferentially contractible to cause the bore thereof to tightly grip the outer cylindrical surface of the tube, said body having a pair of apertures extending therethrough in a direction transversely of the axis of the bore, said apertures intersecting said bore and being spaced apart symmetrically with respect to the axis of the bore, the outer surface of said sleeve having a pair of diametrically opposed, radially outwardly inclined cam surfaces thereon, said cam surfaces being aligned one with each of said apertures and clamp means extending through said apertures and engaging said cam surfaces such that the inner periphery of the sleeve at least frictionally engages the tube inserted therethrough, said apertures restraining movement of said clamp means in a direction axially of the bore and radially outwardly of the bore, whereby, when an axially outward force is applied to the tube, said clamp means bear against said cam surfaces and exert radially inwardly directed force against said sleeve to more firmly grip the tube.

2. A coupling as called for in claim 1 wherein said cam surfaces are defined by a pair of diametrically opposite recesses in the outer surface of said sleeve.

3. A coupling as called for in claim 1 wherein said clamp means comprises a generally U-shaped metal clip, the legs of the U extending through said apertures.

4. A coupling as called for in claim 3 wherein said clip comprises a metallic spring.

5. A coupling as called for in claim 3 including means on said legs engaging said body to yieldably resist withdrawal of the clip from said apertures.

6. A coupling as called for in claim 3 wherein the free end portions of said legs are offset laterally and engage edge portions of the apertures at the outer surface portions of the body to yieldably resist movement of the clip outwardly of said apertures.

7. A coupling as called for in claim 8 wherein at least one of said body and sleeve is formed of a yieldable material or otherwise is displaceable to permit insertion of the offset end portions of the clip legs through said apertures.

8. A coupling as called for in claim 1 wherein said sleeve is formed of a plastic material and the bore thereof is provided with serration means for tightly gripping the outer cylindrical surface of the tube.

9. A coupling as called for in claim 1 wherein said body comprises a molded plastic member, said apertures being defined by straight passageways extending transversely through said body between opposite sides thereof.

10. A coupling as called for in claim 1 including interengaging guide means on said sleeve and in said bore for aligning said cam surfaces with said apertures when the sleeve is inserted in said bore.

* * * * *

UNITED STATES PATENT OFFICE
CERTIFICATE OF CORRECTION

PATENT NO. : 4,059,295
DATED : NOVEMBER 22, 1977
INVENTOR(S) : HELM, Homer E.

It is certified that error appears in the above-identified patent and that said Letters Patent are hereby corrected as shown below:

Column 4, Line 47   Cancel "8" and insert -- 6 --

Signed and Sealed this

Twenty-eighth Day of February 1978

[SEAL]

Attest:

RUTH C. MASON
Attesting Officer

LUTRELLE F. PARKER
Acting Commissioner of Patents and Trademarks